No. 686,447. Patented Nov. 12, 1901.
F. FRITSCH, Jr., J. FRITSCH & W. FRITSCH.
FLY TRAP.
(Application filed Aug. 27, 1901.)
(No Model.)
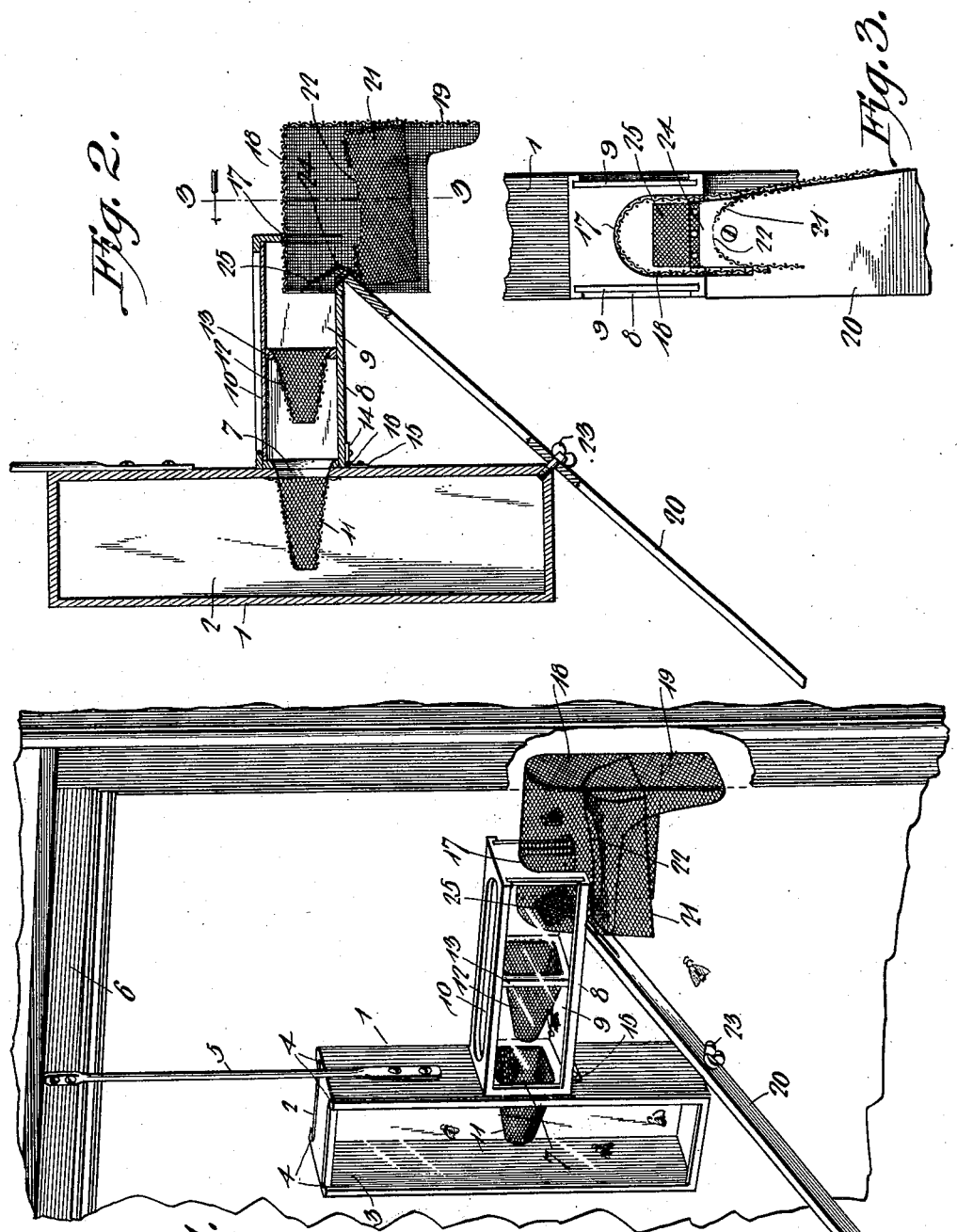

UNITED STATES PATENT OFFICE.

FRANK FRITSCH, JR., JOSEPH FRITSCH, AND WILLIAM FRITSCH, OF SEDRO WOOLLEY, WASHINGTON.

FLY-TRAP.

SPECIFICATION forming part of Letters Patent No. 686,447, dated November 12, 1901.

Application filed August 27, 1901. Serial No. 73,458. (No model.)

*To all whom it may concern:*

Be it known that we, FRANK FRITSCH, Jr., JOSEPH FRITSCH, and WILLIAM FRITSCH, citizens of the United States, residing at Sedro Woolley, in the county of Skagit and State of Washington, have invented a new and useful Fly-Trap, of which the following is a specification.

The invention relates to improvements in fly-traps.

The object of the present invention is to improve the construction of fly-traps and to provide a simple and comparatively inexpensive one adapted to be readily applied to a window-sash and capable of capturing the flies as they ascend the glass thereof.

A further object of the invention is to enable the receptacle for the captured flies to be readily detached from the other parts of the trap for destroying or removing the captured insects.

The invention consists in the construction and novel combination and arrangement of parts hereinafter fully described, illustrated in the accompanying drawings, and pointed out in the claims hereto appended.

In the drawings, Figure 1 is a perspective view of a fly-trap constructed in accordance with this invention and shown applied. Fig. 2 is a longitudinal sectional view of the same. Fig. 3 is a detail sectional view on the line 3 3 of Fig. 2.

Like numerals of reference designate corresponding parts in all the figures of the drawings.

1 designates an oblong receptacle designed to be arranged vertically adjacent to the pane of a window-sash, as illustrated in Fig. 1 of the accompanying drawings, and provided with inner and outer transparent walls 2 and 3, consisting, preferably, of plates of glass arranged in ways 4 of opposite sides of the upright casing 1. The casing 1 is supported by a rod 5, secured by screws or other suitable fastening devices to the receptacle at one side thereof and to the sash 6 at the top of the same.

The receptacle 1 is provided with an opening 7, formed in one of the sides which support the plates of glass, and secured to the receptacle at the said opening is a horizontal casing 8, provided with transparent sides 9 and having a transparent top 10. The casing is provided with a suitable frame which supports the transparent walls, and the bottom of the casing is preferably constructed of wood. The casing forms a passage for conducting the flies into the receptacle, the return of the flies being prevented by cones 11 and 12, disposed approximately horizontally and constructed, preferably, of wire-netting; but any other suitable material may be employed for this purpose. The cone 11 is secured to the receptacle at the opening 7, and the other cone 12, which is arranged within the horizontal casing 8, is secured to a suitable support 13, arranged within the horizontal casing 8. The inner end of the horizontal casing is detachably secured to the receptacle by means of a hinge composed of plates or leaves 14 and 15, provided with registering eyes and receiving a removable pintle or pin 16. The pin or pintle 16 is adapted to be withdrawn from the eyes of the leaves or plates to permit the receptacle to be detached.

The horizontal casing is provided at its outer end with an entrance-opening 17, formed in its end wall and in its bottom and receiving a portion of an upright casing 18, constructed of wire-netting or other suitable material and having an arched or rounded top, and its inner side and outer end are extended below the outer side. The outer end 19 of the upright casing is designed to be placed against the vertical side rail of the window-sash, as indicated in Fig. 1 of the accompanying drawings, and the flies ascending the pane of glass of the sash enter the open bottom of the casing 18 and are directed to the same by an inclined guide 20. The flies are prevented from returning after they enter the upright casing 18 by means of an upwardly-tapered trap 21, constructed of wire-gauze or other suitable material and having a closed outer end and provided at its top with a narrow opening. The flies pass upward through the opening of the trap 21, and as the sides thereof are arranged at an angle to the sides of the casing 18 they separate or diverge upwardly from the latter, so that flies crawling down the inner surfaces of the side walls of the casing 18 will not reach the entrance-opening 22 of the trap of the upright casing.

The inclined guide consists, preferably, of a thin board extending downward at an angle to the adjacent side rail of the sash and secured between its ends to the bottom of the receptacle 1 by means of a thumb-screw 23 or other suitable means and adapted to be readily detached therefrom when the receptacle 1 is removed, as heretofore explained. The upper end of the inclined guide is beveled to fit the lower face of the horizontal casing 8 and is provided with a central extension 24, projecting into the opening at the bottom of the horizontal casing and forming a support for an inclined bottom piece 25, of wire-gauze or other suitable material, which is adapted to constrict the opening of the inner end of the upright casing and which is arranged at an angle to the bottom of the casing to form a guard for preventing the return of the flies. The flies ascending the pane of glass of the window-sash will be directed to the upright casing by the inclined guide and will pass upward into the said upright casing and enter the same at the opening 22 of the trap or guard 21 thereof. This will prevent the flies from returning, and they will continue their upward passage until they pass through the horizontal casing and enter the receptacle 1.

The receptacle 1 may be detached by removing the screws at the lower end of the supporting-rod 5 and by withdrawing the removable pintle and detaching the guide 20.

It will be seen that the fly-trap is exceedingly simple and inexpensive in construction, that it is easily applied to a window-casing, and that it is capable of catching the flies ascending the pane of glass of the sash and of permitting the flies to be readily removed or destroyed. The transparent walls of the receptacle and the horizontal casing and the openings of the wire-netting form a lighted passage-way through which the flies will readily pass.

What we claim is—

1. A fly-trap comprising an inclined guide, a casing arranged at the upper end of the guide and closed at the top and one end and open at the bottom and other end, and a receptacle communicating with the open end of the casing, substantially as described.

2. A fly-trap comprising an inclined guide, a casing arranged at the upper end of the guide and constructed of wire-gauze and provided at its bottom and at one end with an opening, a trap or guard arranged within the opening at the bottom of the casing, and having sides diverging from the sides of the casing, said trap or guard being also provided at its top with an opening, and a receptacle communicating with the open end of the casing, substantially as described.

3. A fly-trap comprising an inclined guard, a casing arranged at the upper end of the guard, and having an open bottom, one of the sides of the casing being extended below the other, a trap or guard arranged within the open bottom of the casing and forming a constricted entrance, and a receptacle communicating with the casing, substantially as described.

4. A fly-trap comprising a horizontal casing having transparent walls and provided at one end with an opening, a guide extending from the opening of the casing, an upright casing communicating with the opening of the said casing and provided at its bottom with an opening, and a receptacle connected with the horizontal casing, substantially as described.

5. A fly-trap comprising an upright casing having an open bottom, a horizontal casing extending from and communicating with one end of the upright casing, a receptacle connected with the horizontal casing, and a guide connected with the receptacle and with the horizontal casing and supporting the latter, substantially as described.

6. A fly-trap comprising the horizontal casing provided at one end with an opening, a receptacle communicating with the other end of the casing, an upright casing open at its bottom and extending into the opening of the horizontal casing and provided with an inclined guard, and a guide for directing the flies to the upright casing, substantially as described.

7. A fly-trap comprising a receptacle having transparent walls, a horizontal casing extending from and communicating with the receptacle and provided with transparent walls, an upright casing open at its bottom and communicating with the horizontal casing, and cones arranged within the receptacle and within the horizontal casing, substantially as described.

In testimony that we claim the foregoing as our own we have hereto affixed our signatures in the presence of two witnesses.

FRANK FRITSCH, JR.
JOSEPH FRITSCH.
WILLIAM FRITSCH.

Witnesses:
F. J. HOELIN,
JOHN LLOYD.